United States Patent [19]

Sahlin

[11] 3,881,357
[45] May 6, 1975

[54] DEVICE FOR INDICATING THE PRESENCE OF A SOLID OBJECT
[75] Inventor: Sven Lennart Sahlin, Vasterhaninge, Sweden
[73] Assignee: AB Mecman, Alvsjo, Sweden
[22] Filed: Feb. 8, 1971
[21] Appl. No.: 113,439

[30] Foreign Application Priority Data
Mar. 11, 1970 Sweden.............................. 3247/70

[52] U.S. Cl. ................................................ 73/37.5
[51] Int. Cl. .......................................... G01b 13/12
[58] Field of Search.................. 73/37.5, 37.6, 37.7; 33/DIG. 2; 62/5

[56] References Cited
UNITED STATES PATENTS
3,339,631   9/1967   McGurty et al.................... 62/5 UX
3,481,180  12/1969   Jones................................... 73/37.5
3,545,256  12/1970   Beeken............................... 73/37.5
3,597,961   8/1971   Pinkstaff............................. 73/37.5
3,673,856   7/1972   Panigati.............................. 73/37.5

Primary Examiner—Richard C. Queisser
Assistant Examiner—Joseph W. Roskos
Attorney, Agent, or Firm—Mason, Kolehmainen, Rathburn & Wyss

[57] ABSTRACT

A device for indicating the presence of an object comprises a nozzle adapted to be connected to a source of pressurized gas and having an outlet passage formed as a tubular space between two coaxial tubes. Pressure sensitive means are connected to the rear end of the inner tube, and the outlet passage contains guide ribs extending helically to impart a rotary movement to the expelled air.

6 Claims, 1 Drawing Figure

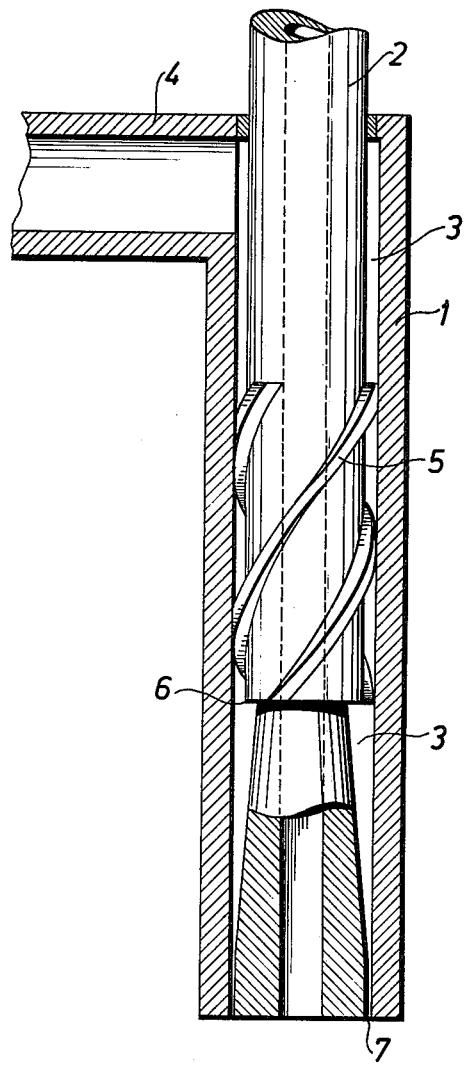

DEVICE FOR INDICATING THE PRESENCE OF A SOLID OBJECT

BACKGROUND OF THE INVENTION

The invention relates to a device for indicating the presence of a solid object or a liquid surface.

The British Pat. Specification No. 1,029,826 describes a device of this type. A nozzle adapted to be connected to a source of pressurized gas has an outlet passage formed as a tubular space between two coaxial tubes, and pressure sensitive means are connected to the rear end of the inner tube to indicate the changed pressure, when the tubular air curtain ejected from the nozzle hits an object just in front of the nozzle.

Thus, the operation of the known device is based on the fact that a negative pressure normally arising inside the jet of air is at least partly neutralized when said jet rebounds from a surface. Owing to the negative pressure in its interior, however, the tubular curtain or jet of air expelled from the nozzle tends to converge conically into an almost solid air jet shortly in front of the nozzle, wherefore the device can only be used to indicate objects at a short distance from the nozzle, generally at most 5 to 6 mm.

SUMMARY OF THE INVENTION

According to the invention, the indicating device described above has been improved so that it can readily discover objects at a longer distance from the nozzle, e.g., 20 to 30 mm. Such an increase of the range of indication may be of importance, inter alia, in case the device has to sense a passing row of objects having slightly varying heights. The new device is characterized in that the outlet passage of the nozzle contains one or several guide ribs extending helically around the axis of the nozzle to impart a rotary movement to the expelled air.

Thus, outside the nozzle orifice the air curtain will be influenced by a centrifugal force, the magnitude of which depends on the velocity of the air stream and the pitch angle of the guide ribs. The centrifugal force counteracts the contracting force generated by the nagative pressure within the air curtain, and thus it is possible to obtain a cylindrical or conically diverging air curtain which effectively senses objects at the distance mentioned, i.e., up to about 30 mm. Theoretically, an even better result might be obtainable when supplying air of high pressure to the nozzle, but the angle of divergence of the air curtain cannot be increased too much, as this would result in an equalized negative pressure, so that the difference in pressure would be difficult to measure. On the other hand, there are nowadays sensitive pressure meters which react to pressure variations as small as 1 mm water column.

DETAILED DESCRIPTION OF A PREFERRED EMBODIMENT

The accompanying drawing shows an axial section through an embodiment of an indicating nozzle made according to the invention. As mentioned, the nozzle consists of two coaxial tubes 1 and 2 between which a passage 3 annular in cross section is formed. The outer tube 1 is closed at the rear end where it has a side inlet 4 adapted to be connected to a source of pressurized air. The rear end of the inner tube 2 is connected to a pressure meter not shown.

A central portion of the passage 3 between the tubes is provided with helically extending guide ribs 5 which may consist of separate elements secured to the inside of the outer tube 1 or the outside of the inner tube 2. Alternatively, the ribs 5 may be cut as threads integral with the inner tube. In the embodiment shown, three guide ribs 5 extend approximately 3/4 of a turn around the inner tube at a pitch angle of about 50°. As seen in the direction of flow of the air, the guide rubs 5 end at a shoulder 6 provided on the inner tube 2, i.e., at a cross section where the outer diameter of the inner tube is suddenly reduced and consequently the cross section area of the passage 3 is correspondingly increased. From said shoulder 6 the exterior of the inner tube 2 widens conically so that the passage 3 between the tubes gets a progressively reduced cross section up to a narrow annular outlet opening 7. Thus, the air stream passing in a helical path along the guide ribs 5 becomes greatly compressed and accelerated and leaves the outlet orifice at great speed.

At a determined initial speed of the air introduced at the rear end of the passage 3, the speed of rotation of the air becomes of course primarily dependent on the pitch of the guide ribs 5, but a small pitch angle which imparts increased rotation to the air simultaneously causes an undesirable braking of the axial speed component. For this reason, it is convenient to make the pitch angle comparatively great, 45° to 60°, and to cause an acceleration before the outlet, as described above.

What I claim is:

1. A device for indicating the presence of a solid object or a liquid surface, comprising a nozzle adapted to be connected to a source of pressurized gas and having an outlet passage formed as a tubular space between two coaxial tubes, pressure sensitive means being connected to the rear end of the inner tube to indicate the changed pressure, when the tubular air curtain ejected from the nozzle hits an object, characterized in that the outlet passage of the nozzle contains one or several guide ribs extending helically around the axis of the nozzle to impart a rotary movement to the expelled air, so that a cylindrical or conically diverging air curtain may be obtained.

2. The device of claim 1 wherein the inner one of said two coaxial tubes is formed with an inwardly extending shoulder on the outer surface thereof spaced inwardly of the outlet of said nozzle, said inner tube including an enlarging tapered outer surface extending from said shoulder toward said outlet for forming said conically diverging air curtain.

3. The device of claim 1 wherein said helical guide ribs are formed at a pitch angle of 45° to 60°.

4. The device of claim 2 wherein said helical guide ribs are formed at a pitch angle of 45° to 60° and terminate adjacent said shoulder on said inner tube.

5. A fluid operated sensor comprising a pipe member having one end open and an opposite end thereof connected to a fluid operated control circuit, an annular nozzle surrounding at least a portion of said pipe member and having an annular orifice surrounding said open end of said pipe member, at least one pressure fluid input duct connected with a source of pressurized fluid and opening into said annular nozzle at a distance from said annular orifice, thereby to convey a stream of fluid through said annular nozzle and to allow said annular orifice to create a fluid jet in a detection direction of the sensor and to determine pressure conditions within said pipe member depending on said fluid jet, at least one among said input duct and said annular nozzle having surface means imparting a helical movement to said stream of fluid passing through said annular nozzle, thereby to obtain a jet outgoing from said annular orifice, with a rotatory movement component and wherein according to the improvement said surface means comprise fins within said annular nozzle and imparting a helical movement to the stream passing through said annular nozzle.

6. A fluid operated sensor comprising a pipe member having one end open and an opposite end thereof for connection to a fluid operated control circuit, an annular nozzle surrounding at least a portion of said pipe member and having an annular orifice surrounding said open end of said pipe member, at least one pressure fluid input duct for connection with a source of pressurized fluid and opening into said annular nozzle at a distance from said annular orifice for conveying a fluid stream through said annular nozzle passing out said annular orifice to create a fluid jet in a detection direction of the sensor determining pressure conditions within said pipe member depending on said fluid jet, at least one among said input duct and said annular nozzle having surface means imparting a helical movement to said stream of fluid passing through said annular nozzle, forming said jet outgoing from said annular orifice with a rotatory movement component, said surface means comprising fins within said annular nozzle and imparting a helical movement to the stream passing through said annular nozzle.

* * * * *